United States Patent [19]

Grundy

[11] 4,270,395
[45] Jun. 2, 1981

[54] MOTION TRANSLATING MECHANISM

[76] Inventor: Reed H. Grundy, 4081 W. Benden Dr., Murrysville, Pa. 15668

[21] Appl. No.: 48,278

[22] Filed: Jun. 13, 1979

Related U.S. Application Data

[62] Division of Ser. No. 811,529, Jun. 30, 1977, Pat. No. 4,173,151.

[51] Int. Cl.³ ............................................. F16H 21/18
[52] U.S. Cl. ............................................. 74/49; 74/52
[58] Field of Search ................... 74/40, 49, 50, 52, 45, 74/46, 47, 48, 65, 66, 67, 68, 69; 123/54 R, 55 A

[56]  References Cited

U.S. PATENT DOCUMENTS

| 1,056,746 | 3/1913 | Pitts | 74/52 UX |
| 1,508,937 | 9/1924 | Pocock et al. | 74/49 X |
| 2,166,975 | 7/1939 | Sologaistoa | 74/52 |
| 2,199,625 | 5/1940 | Fernbrugg | 74/52 |

FOREIGN PATENT DOCUMENTS

1227399  4/1971  United Kingdom ..................... 74/40

Primary Examiner—J. Franklin Foss
Attorney, Agent, or Firm—Harold A. Williamson

[57]  ABSTRACT

The motion translation mechanism of the invention includes a crankshaft having a crank arm with an integral eccentric pin. A circular linkpiece is provided which has an opening positioned eccentric to the center axis of the circular linkpiece and positioned within the circular linkpiece eccentric opening. A displacement member with flat bearing surfaces is mounted for reciprocating motion and has a circular opening. A first thrust converting means secured to the circular linkpiece, as well as, second and third thrust converting means that come into consecutive contact with the first thrust converting means. The circular linkpiece is positioned within the circular opening of the displacement member, whereby reciprocating motion transmitted to the displacement member is converted to rotary motion of the crankshaft via the apparatus just enumerated.

13 Claims, 39 Drawing Figures

MOTION TRANSLATING MECHANISM

This is a division of application Ser. No. 811,529, filed June 30, 1979, now U.S. Pat. No. 4,173,151.

This invention relates to a motion translating mechanism.

More specifically this invention relates to a reciprocating to rotary motion or rotary to reciprocating motion mechanism which can replace the prior art connecting rod, crankshaft mechanism in all forms of piston engines, air compressors, etc. The mechanism is ideally suited for use in any engine configuration including single cylinder, in line, opposed, "V," "X," and radial. The invention is also ideally suited for free piston engines.

The motion translation mechanism of the invention includes a crankshaft having a crank arm with an eccentric pin integrally secured to the crank arm. The crank shaft is mounted so that the crank arm and the eccentric pin rotate about a crankshaft axis. A circular linkpiece is provided which has a center axis parallel to the crankshaft axis. The circular linkpiece has an opening positioned eccentric to the center axis of the circular linkpiece. The crank arm eccentric pin is positioned within the circular linkpiece eccentric opening in a manner that allows relative rotary movement between the eccentric pin and the circular linkpiece in a path in a fixed plane. The final element of the mechanism is a displacement member mounted for reciprocating motion and having a circular opening in the aforementioned fixed plane. The circular opening having a central axis at right angles to the fixed plane. The circular linkpiece is positioned in mating relationship within the displacement member's circular opening whereby reciprocation motion transmitted to the displacement member is converted to rotary motion of the crankshaft about the crankshaft axis through the relative motion of the displacement member, the circular linkpiece and the integrally secured eccentric pin of the crankshaft.

In a free piston engine the crankshaft crank arm and associated eccentric pin are omitted.

This just described mechanism is small in size and light in weight in comparison to conventional connecting rod arrangements now in use. The compactness of the mechanism and its low weight results a lower total energy use to drive the mechanism during its lifetime.

Most engines can be thermodynamically described with a pressure volume (PV) diagram or curve. Depending upon the direction of integration, the area enclosed by the curve represents the energy received from the engine for one complete cycle. In the case of an air compressor the area enclosed by the curve represents the energy input to the compressor during one complete cycle. The power output is determined by how rapidly one can traverse the curve on the PV diagram. The maximum power output is determined by the number of PV cycles completed per unit of time. The number of cycles per unit time is a function of the engine's dimensions and most often the limiting variable in the engine is the velocity the seal can withstand against the combustion or compression zone. Most engines are constructed of similar materials, eg. cast iron for the seals and aluminum or cast iron for the working volumes. In such arrangements a fixed specific output is available regardless of engine configuration. This is true whether the engine is of the piston or Wankel type. The Wankel is limited by the velocity of its tip seal in much the same manner as a piston is limited by the velocity of the piston ring. A major advantage the Wankel possess over the state of art piston engines resides in the fact that the Wankel possess an "eccentric" mechanism which rotates within the working volume and does not use a connecting rod. The use of a connecting rod raises the overall height of an engine and requires an additional amount of material to connect the crankshaft to the piston which acts upon the working volume. The invention to be described provides a motion translating mechanism which will eliminate the connecting rod. The elimination of the connecting rod also allows for a reduction in the total cylinder wall length which reduces the total engine by a factor that is measured by the connecting rod removal and cylinder wall reduction.

State of the art piston engines are burdened with the problem of unbalance forces caused by the use of a connecting rod. These unbalanced forces arise because the connecting rod employed to translate the linear motion of the piston to rotary motion of the crankshaft is not sinusoidal. This nonsinusoided delivery of unbalanced forces requires that a large number of cylinders and related crank rods be employed before a balance state can be achieved. The invention to be described involves pure sinusoidal motion by the piston which results in forces easily canceled by means of counterweights located on the crankshaft. The invention therefore makes possible the increase of individual cylinder displacement with the attendant reduction in number of cylinders, all while simultaneously maintaining perfect balance with a total reduction of moving parts and an increase in reliability.

State of the art piston engines are burdened in yet another manner in that the piston construction must be of sufficient area to counteract a side force caused by the angularity of movement experienced by the connecting rod. These piston side forces cause design engineers to consider and then select compatible materials for use in the construction of cylinder walls and pistons. The lubrication of the piston side walls also becomes critical. This lubrication which is generally accomplished by vapor or spray often proves insufficient and results in scuffing of the piston walls at high piston loads. In a similar manner the designer of compression ignition engines experience a multitude of difficulties when trying to achieve oil cooling of the piston crown. The invention to be described accurately maintains the space between piston and cylinder walls by use of a hydrodynamic bearing. The side force problem and that of lubrication noted above are therefore totally eliminated by the use of the invention. In respect of oil cooling of the piston crown the invention significantly diminishes this problem.

The invention to be described hereinafter further provides an engine with a significantly reduced overall engine block height which allows for a side mounted camshaft to be positioned closer to the cylinder head thereby reducing the weight of the valve train and increasing valve train life. This reduction in weight results in higher attainable horsepower and/or better fuel economy.

Still another advantage that will result from the invention's use in multicylinder engines rests in the fact that the motion translating device incorporating the invention requires fewer main bearings for the crankshaft which reduces internal main bearing friction losses with an accompanying increase in power output and fuel economy. In respect of the crankshaft of the invention the distance from the crankshaft's eccentric center to its rotational center is one fourth of the stroke dimension as compared to one half the stroke dimension in conventional piston engines. As a consequence of this unique arrangement the crankshaft of the invention is small enough to permit the use of what are generally referred in the art as "anti-friction bearings."

The elimination of a connecting rod or rods in the motion translation device embodying the invention results in a reduction of reciprocating weight of as much as sixty percent (60%). This weight reduction in reciprocating weight significantly reduces the amount of material required for strengthening the crankshaft as well as a reduction in material required in the engine block for rigidity. For example, extensive structural webbing, required in most crank case housings, to support a crankshaft that in turn supports reciprocating connecting rods, is not necessary.

A study of the prior art both as evidenced by publications and patents reveals at least two pertinent teachings that are readily distinguished over by the invention to be described.

There is what has been termed the Wolf mechanism described in the magazine *Popular Science* of July, 1975 pages 78 to 80, which mechanism is previously described in literature as the cruciform engine originally conceived for use with steam engines and more recently adapted for use in an internal combustion engine in Great Britian. The motion translating mechanism shown in the above-noted publication has as its final reciprocating moving element pistons which travel in their respective cylinder bores rather than in a region near the crankshaft as is present in the invention to be described more fully hereinafter. A major disadvantage of the British engines' motion translating mechanism resides in the fact that side forces generated by movement of this mechanism are borne by the skirts of the pistons noted earlier. These side forces borne in this fashion introduce a bending moment to the reciprocating structural member connected directly to the piston. This requires that the reciprocating structural member be of a large size to thereby handle the bending forces. In the invention to be described little or no bending forces exist in the reciprocating structure of the displacement member because the side forces are borne by a bearing surface which is provided in close proximity to the crankshaft center line. The unique arrangement of this mechanism of the invention allows the piston secured to the displacement member to travel the length of a cylinder bore without the requirement for actual contact with the bore. This significant distinction allows for the selection of piston and cylinder wall materials heretofore prohibited.

Another important contribution to the state of the art which the invention makes possible is that the motion translating mechanism of the invention is of such compact design that the entire mechanism can fit and function within the bore of a cylinder that carries the piston. Use of the invention results in the displacement member secured to the piston to experience primarily tension forces which require only minimal cross section area to sustain these tension forces.

The patent to Sologaistoa, U.S. Pat. No. 2,166,975 discloses a motion translating mechanism that includes a gear arrangement that incorporates a 360° ring gear and a mating planet gear for purposes of start up and timing of the piston driven by the mechanism shown. It will be appreciated upon further study that the invention described hereinafter may employ only a short ring gear segment, typically only 60° on either side of the crankshaft which allows for a more compact structure. The use of gear segment also has the advantage of allowing the replacement of worn gear segments without disassembly of the engine. In addition the gear segments may be adjustibly mounted to take into account the need for hydraulic take up necessary to assure silent operation.

It is therefore an object of the invention to provide an improved motion translating mechanism of such simple and compact design that its incorporation in any engine will require a substantial reduction in the energy necessary to activate the mechanism as is presently required in state of the art engines of similar end use.

Another object of the invention is provide a rotary to reciprocating motion mechanism which is prefectly balanced thereby eliminating the need for a large number of cylinder and associated parts required by state of the art engines to allow smooth operation.

And yet another object of the invention is to provide a perfectly balanced rotary to reciprocating motion mechanism that will inherently provide an overall increase in economy of manufacture, maintenance and reliability.

Another object of the invention is provide a rotary to reciprocating motion mechanism that will inherently allow the utilization of similar metals or materials in the construction of the piston and cylinder walls of an engine that employs the invention, thereby eliminating the need for coatings or the use of dissimilar metals.

Another object of the invention is provide a rotary to reciprocating motion mechanism of such compact size that when employed in internal combustion engines the camshaft may be in very close proximity to the engine's cylinders which will result in a lower total weight of the valve train assembly with a concommitant increase in economy and engine output.

Still yet another object of the invention, that will follow as a consequence of the incorporation of the rotary to reciprocating motion mechanism of the invention is the reduction in the large number of bearings presently necessary to locate and secure a crankshaft in any engine of a given size in comparison to similar state of the art engines.

Still a further object of this invention is to provide an engine with a hydrodynamic bearing for the purposes of accepting the side thrusts incurred in the engine's motion translating mechanism thereby eliminating the possibility of piston to cylinder scuffing while simultaneously easing the task of supplying oil for piston crown cooling.

A further object of this invention is to provide an overall power system for a vehicle which is smaller in size and weight compared to state of the art power systems which results in an increase in overall vehicle efficiency.

A further object of the invention is to provide an engine or motor which requires less energy to construct and operate than presently known engines or motors.

Yet another object of this invention is to provide a motion translating mechanism that may be readily incorporated in engines of single or multiple cylinder; as well as cylinder arrangements of the "V," "X," or radially opposed.

A final object of this invention is to provide a free piston engine that incorporates the basic mechanism of the invention.

In the attainment of the foregoing objects the invention in a basic embodiment has a reciprocating to rotary motion mechanism that includes in combination a crankshaft having a crank arm with an eccentric pin integrally secured to the crank arm. The crankshaft is mounted so that the crank arm and the eccentric pin rotate about a crankshaft axis. In addition there is provided a circular linkpiece which has a center axis parallel to the crankshaft axis. The circular linkpiece has an opening positioned eccentric to the circular linkpiece center axis. The crank arm eccentric pin is positioned within the circular linkpiece eccentric opening in a manner that allows relative rotary movement between the eccentric pin and the circular linkpiece in a path in a fixed plane. The circular linkpiece is also provided with at least one thrust converting means in the form of a gear or cam segment which is secured to the circular linkpiece for rotation therewith.

A displacement member is mounted in a sliding abutting relationship between a pair of walls. The walls contain internally projecting thrust converting means in the form of gear or cam segments. The displacement member has a circular opening in the fixed plane with a central axis at right angles to the fixed plane. The circular linkpiece is positioned in mating relationship within the displacement member's circular opening. The thrust converting means of the circular linkpiece comes into consecutive mating engagement with the thrust converting means of the pair of walls during reciprocating travel of the displacement member.

The displacement member's reciprocating motion is converted to rotary motion of the crankshaft about the crankshaft axis or vice versa through the relative motion of the displacement member, the circular linkpiece, thrust converting means and the integrally secured eccentric pin of the crankshaft.

Another embodiment of the invention embraces the need to operate multiple reciprocation displacement members from a common rotary crankshaft. The mechanism of the invention that accomplishes this operation includes a crankshaft having a crank arm with an eccentric pin integrally secured to the crank arm so that the crank arm and the eccentric pin rotate about a crankshaft axis. There are at least two circular link pieces each having a center axis parallel to the crankshaft axis. Each of the circular linkpieces have an opening positioned eccentric to the center axis of each of the circular linkpieces. The circular linkpieces are mutually secured to each other such that the eccentrically positioned openings share a common axis. The crank arm eccentric pin is positioned within the circular linkpiece's eccentric openings in a manner that allows relative rotary movement between the eccentric pin and the mutually secured circular linkpieces in a path in a fixed zone defined by the circular linkpiece's movement. Each of the circular linkpieces are positioned such that they are in mating relationship within the displacement member's circular openings, whereby reciprocating motion transmitted to the displacement members is converted to rotary motion of the crankshaft or vice versa about the crankshaft axis through the relative motion of the displacement members, the mutually secured circular linkpieces and the integrally secured eccentric of the crankshaft crank arm.

In another embodiment of the invention a free piston engine is created by the elimination of the crankshaft, crank arm and eccentric pin.

The motion translating mechanism of the embodiments set forth above will find direct application and use in compressors, internal combustion engines utilizing the Otto, Diesel and Braden cycles, external combustion engines such as the Sterling and steam cycles, pumps and hydraulic motors.

Other objects and advantages of the present invention will become apparent from the ensuing description and illustrative embodiments thereof, in the course of which reference is made to the accompany drawings in which

FIG. 1a' through FIG. 1e' represent a modified vector diagram of the motion translation mechanism of FIG. 1a through 1e.

FIG. 2a is a cross-section of FIG. 2 taken along the line 2a,2a.

FIG. 3a', 3b', 3c' and 3d' represent a modified vector diagram of the motion translation mechanism of FIG. 3a through FIG. 3d'.

FIG. 5a is a cross section view of FIG. 5 taken along the line 5a—5a.

Figure 1A:
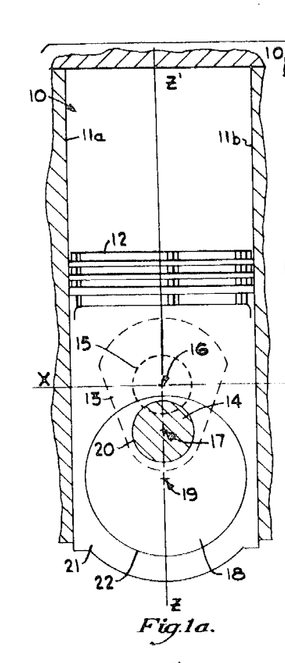
FIG. 1a through FIG. 1e illustrate the basic components of a motion translation mechanism which embodies the invention.

Reference is now made to FIG. 1 which is composed of a plurality of separate illustrations, namely FIG. 1a through FIG. 1e, which depict the motion translation device in a variety of positions. FIG. 1a as with the other FIG. 1 illustrations depict only sufficient structure to explain the nature of inventive mechanism's operation. Accordingly, there has been shown in each of the FIGS. 1a to 1e a cylinder 10 which has shown in section cylinder side walls 11a, 11b. Mounted for reciprocating motion within the cylinder walls 11a, 11b is a piston 12 which has integrally secured thereto a displacement member 21. The displacement member 21, its design and function, will be explained more fully hereinafter. The displacement member 21 and related piston 12 are mounted to move in a reciprocating fashion along axis ZZ'.

Attention is now directed specifically to FIG. 1a of FIG. 1 where the details of the motion translating mechanism will be described. In this embodiment there is shown a crankshaft 15, shown in dotted outline, having a crankshaft center axis depicted by reference numeral 16 and associated arrow. There is shown in all of the FIGS. 1a through 1e axis line XX' which passes through crankshaft center axis in each of the illustrations of FIG. 1.

The crankshaft 15 has an integral extension thereof a crank arm 13, also shown in dotted outline. The crank arm 13 has an eccentric pin 14 integrally secured to the crank arm such that the eccentric pin's center axis designated by reference numeral 17 and associated arrow is always parallel to the crankshaft center axis 16.

This displacement member 21 has a circular opening 22 into which there is fitted in mating relationship a circular linkpiece 18. The circular linkpiece 18 has a center axis depicted by reference numeral 19 and associated arrow. The circular linkpiece 18 has a circular opening positioned eccentric to said linkpiece axis 19. The center axis of the circular linkpiece circular opening has a center axis coincident with said eccentric pin center axis 17 and the eccentric pin 14 fits in mating engagement with the circular opening 20 of the circular linkpiece 18.

Figure 1B:
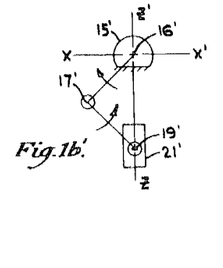
Figures 1B, 1C:
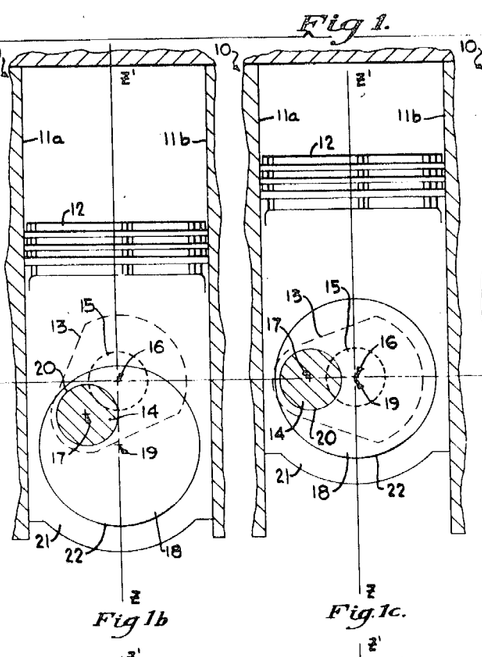
Figure 1C:
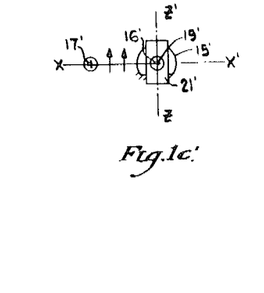
Figures 1D, 1E:
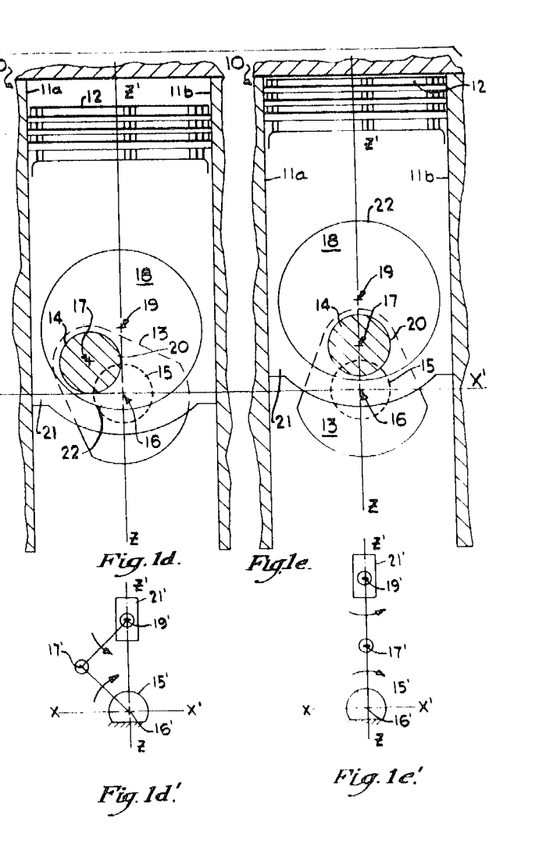

The operation of the motion translating mechanism of the invention can best be appreciated by a consecutive study of FIGS. 1a through 1e in which the crankshaft is shown in a variety of rotated positions ranging from that shown in FIG. 1a where the crank arm 13 of the crankshaft 15 downwardly position on the axis ZZ', to FIG. 1e where the crankshaft 15 and associated crank arm have been rotated in a clockwise fashion through 180° to a vertical position on axis ZZ'. A study of FIG. 1b shows that when the crank arm has been rotated in a clockwise direction through 45° the circular linkpiece 18 mounted on the eccentric pin 14 has rotated in a counterclockwise fashion to the position shown in this FIG. 1b.

The movement just described results in the cooperative upward movement of displacement member 21 and its associated piston 12.

It can quickly be appreciated that the motion and relative position of the mechanism's components continue their relative cooperative movement as the crank arm 13 moves into a position 90° from its start as shown in FIG. 1c. Similar relative motion is experienced as shown in FIG. 1d and finally that shown in FIG. 1e. From the brief description above, it will be appreciated that the circular linkpiece 18 rotates counterclockwise around the center axis 17 of the eccentric pin 14 through an arc which is the same as the crankshaft 15 rotates clockwise. The circular linkpiece 18 however rotates at twice the angular velocities of the crankshaft 15 with respect to crankshaft eccentric pin 14.

When FIG. 1a is studied with respect to the physical distance measured along axis ZZ' between crankshaft center axis 16 and circular linkpiece center axis 19 and thus dimension is compared with the total vertical movement of the displacement member 21, it will be noted that the displacement member 21 moves through two (2) times the distance between crankshaft center axis 16 and circular linkpiece center 19.

Reference is now made to FIG. 1a' through 1e' which depict in briefest form a vector diagram which represents the physical embodiment illustrated in FIGS. 1a through 1e. Each vector diagram FIG. 1a' through 1e' are positioned beneath the corresponding mechanical configuration of the translation mechanism that embodies the invention. The crankshaft 15 of FIG. 1a is depicted by a semi-circular representation 15' with hash marks beneath to represent that the crankshaft is fixedly mounted for rotation. The crank arm 13 of FIG. 1a is represented by a line between crankshaft center line 16 and eccentric pin center axis 17. In the description that follows this vector that refers to the crank arm 13 will be termed "vector 16'17'". In a similar fashion vector line 17'19' represents circular linkpiece 18 of FIG. 1a.

The displacement member 21 of FIG. 1a is shown schematically in FIGS. 1a' through 1e' as rectangular box 21'. It will be appreciated that as shown in FIG. 1b' when the crank arm 13 begins a clockwise rotation indicated by the arrow crossing vector 16'17' the vector 17'19', which represents the circular linkpiece 18, will rotate counterclockwise.

Referring now to FIG. 1c', it will be noted that if the displacement member 21' stops in the position shown in this figure, the circular linkpiece 18, as shown in FIG. 1c, is free to rotate inside the displacement member 21 when the crankshaft 15 and associated crank arm 13 are rotated. While not shown in this illustration, a more extensive force vector analysis will show that in the dynamic use pressure on the crown of the piston 12 produces abnormally high side thrusts in respect of the displacement member 21 and the cylinder walls 11a, 11b. No description is offered in respect of FIGS. 1d' and 1e' in that a review of these illustrations merely trace the continued vector movement through the last 90° of crank arm 13 travel.

Figure 2:
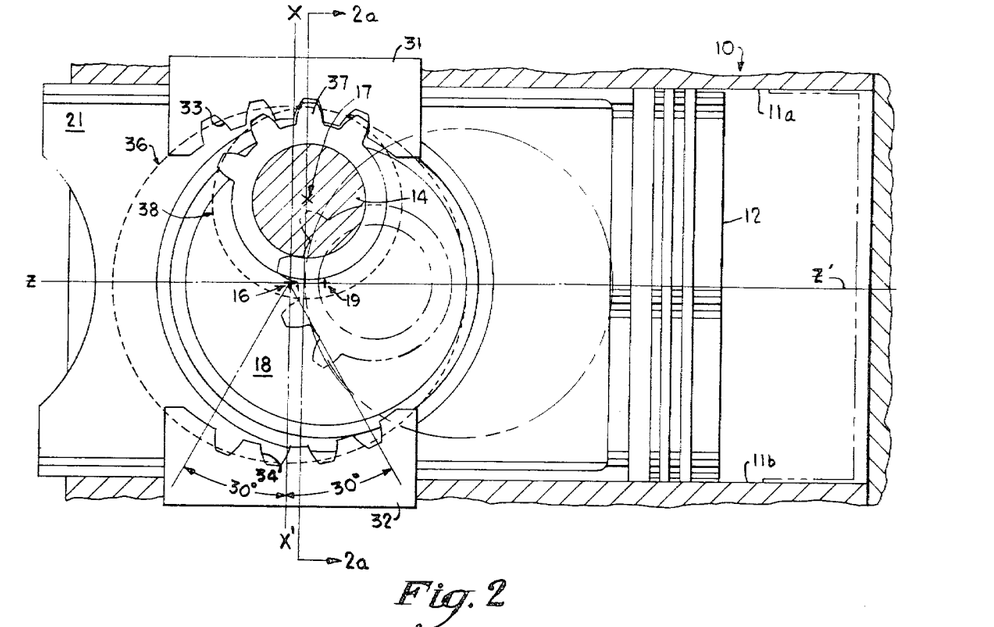
FIG. 2 is a cross-sectional showing of a single-piston-cylinder arrangement that embodies one species of the invention.
Figure 2A:
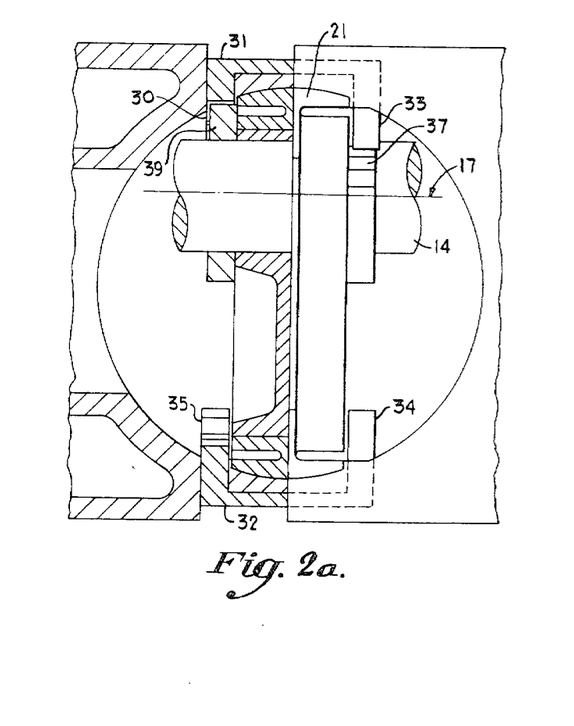

Reference is now made to FIG. 2 and FIG. 2a which should be viewed together in order to better understand the relationship of the components and the function of the motion translating mechanism of the invention. The components of FIG. 2 and FIG. 2a are basically those shown and depicted in respect of FIG. 1a and 1e and where the identity is the same like reference numerals wll be employed in the description of the FIG. 2, 2a. The structure of FIG. 2 and 2a represents one embodiment of the invention and includes structure that compensate for the abnormally high side thrust pressure noted earlier in respect of the displacement member 21 and cylinder walls 11a, 11b which pressure is experienced when the motion translating mechanism is in the position as shown in FIG. 1c, FIG. 1c'.

Attention is directed to FIG. 2 wherein this embodiment of the invention includes in cylinder wall 11a, a ring gear support member 31 which has inwardly projecting gear teeth 33. The ring gear support member 31 is secured to the cylinder wall 11a by means not shown. Any mechanical fastening device may be employed that will allow for the ready removal and replacement of the ring gear segment support member 31. The details of the means to secure the ring gear segment support member 31 in and to the cylinder walls does not form a part of this invention. A second ring gear segment support member 32 is secured in cylinder wall 11b. Each of the ring gear support members 31, 32 have respectively inwardly projecting gear teeth 33, 34. When the ring gear segment support member 31, 32 and their associated inwardly projecting gear teeth 33, 34 are in the position shown in FIG. 2, their physical location defines a ring gear pitch circle 36 shown in dotted outline.

The eccentric pin 14 carries thereon a planet gear segment 37 which has a pitch circle 38. The pitch circle 38 of the planet gear segment 37 is coincident with the pitch circle 36 of the ring gear segments 31, 33 and 32, 34 at a point where the planet gear segment 37 in in contact with the ring gear segments. The pitch circle 38 of the planet gear segment 37 is as shown concentric with eccentric pin center 17, while the diameter of the pitch circle 36 is twice the diameter of the pitch circle 38. Reference to FIG. 2a will reveal that in this embodiment of the invention the eccentric pin 14 careies a pair of planet gear segments 37, 39 positioned on either side of the displacement member 21. In order to accomodate the pair of planet gear segments 37, 39 the ring gear support members 31, 32 are provided with respectively, two sets of inwardly projecting ring gear teeth 30,33 and 34, 35. The pair of planet gear segments 37, 39n and ring gear segments 30, 31, 33 and 32, 34, 35 function to balance the high side thrust pressure noted earlier.

A significant attribute to this embodiment of the invention resides in the fact that the ring gear segments 30, 33 and 34, 35 do not have to be a full 360° since the side thrust forces are high only when the eccentric pin 14 is near the axis XX'. The fact that only a small ring gear segment is employed rather than a complete 360° ring gear removes the problem of displacement member 21 interference during travel with such a 360° gear. In this embodiment the ring gear segments as shown in FIG. 2 are approximately thirty (30°) degrees on either side of the axis XX'. Thus they comprise a total of 120° out of the 360° possible travel by the eccentric pin 14. It can also be appreciated that FIG. 2 is viewed that when the circular linkpiece 18 is in the position indicated in FIG. 1c, the circular linkpiece 18 is no longer free to provide inside the displacement member 21. When the motion translating mechanism of the invention is in the position shown in FIG. 1c, it will from time to time hereinafter be referred to be in the "starting positon." The addition of the physically cooperating and reacting planet gear segments 37, 39 and pairs of ring gear segments 30, 33 and 34, 35 now cause the circular linkpiece 18 to counter rotate from the direction of the eccentric pin 14 thereby causing a thrust along the axis ZZ' against the displacement member 21 insuring proper continued motion when the motion translating mechanism is in a starting position as in FIG. 1c.

In viewing FIG. 2, it will be appreciated that the necessity of maintaining the proper diameter of the ring gear pitch circle 36 and planet gear segment pitch circle 38 require a relatively small diameter for that of eccentric pin 14 of crank arm 13; crank arm 13 is not shown in this figure.

It is possible to increase the size of the eccentric pin 14 so that it exceeds the true pitch circle required by ring gear segments 30, 33 and 34, 35. In such a case it is possible to develop a tooth profile or profiles which will contrive to maintain the proper relationship between the circular linkpiece 18 with respect to the cylinder walls 11a, 11b. One such arrangement can be found in FIG. 5.

Figure 5:
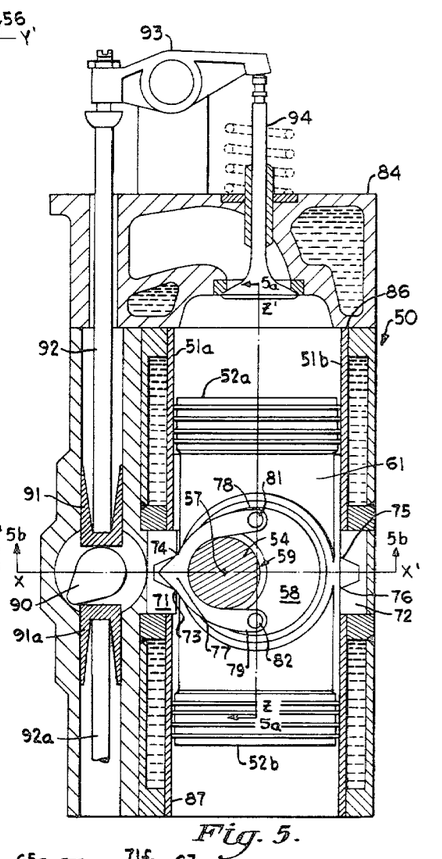
FIG. 5 illustrates a cross section of a multi-cylinder opposed piston engine which embodies one species of the invention.
Figure 5A:
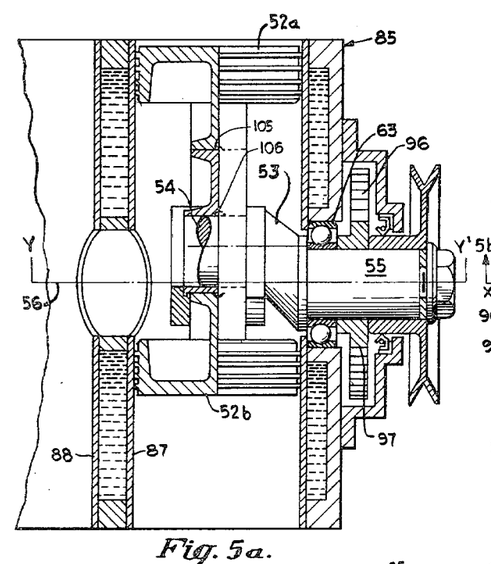
Figure 5B:
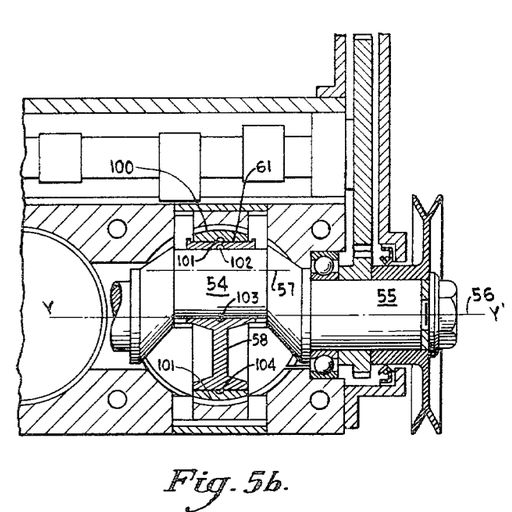
FIG. 5b is a cross section view of FIG. 5 taken along the line 5b—5b.

Reference is now made to FIG. 5, FIG. 5a, and FIG. 5b, which illustrate a portion of a multi-cylinder four cycle opposed engine. The engine of FIG. 5, 5a and 5b consists of opposed pistons such as pistons 52a, 52b. In FIG. 5a and FIG. 5b, the crankshaft 55 has been shown rotated ninety degrees.

In the commentary that follows, FIGS. 5, 5a and 5b should be studied in conjunction with each other as these figures represent various sectional views of the same engine which contains the embodiment of the invention. The engine depicted in FIG. 5 contains the same basic elements described earlier with reference to FIG. 1, FIG. 2 and FIG. 2a, namely, a cylinder 50 with cylinder walls 51a, 51b, which contain for travel therein a piston 52a that moves along axis ZZ' with associated displacement member 61. Th displacement member 61 has positioned therein as shown a circular linkpiece 58 which has a circular linkpiece center axis designated by arrow 59. The circular linkpiece 58 has passing there through an eccentric pin 54 which has an eccentric pin center axis 57 which is parallel to crankshaft center axis 56. The crankshaft 55 is mounted in crankshaft bearing 63. Integral with the crankshaft 55 is crank arm 53. For purposes of illustration, FIG. 5 shows only one cylinder head 84 in detail. It should be understood that a similar cylinder head not shown is located at the opposite end of the cylinder to thereby establish the working volume for piston 52b.

The physical positioning of the piston 52a and displacement member 61 as shown in FIG. 5 is in the same relative position as that shown in FIG. 1c. While FIG. 2 and FIG. 2a depict an embodiment of the invention in which ring gear segments 30, 33 and 34, 35 are provided as thrust members during start up or passage of the piston in its full cycle of travel, FIG. 5 shows thrust support members 71, 72 with inwardly projecting portions 73, 74 and 75, 76 respectively. In place of a planet ring gear segment 37 (FIG. 2) there is provided a single toothed thrust converting means 77. The single toothed thrust converting means 77 has a yoke shaped configuration as shown with the bifurcated ends 78, 79 of the yoke shaped thrust converting means secured to the circular linkpiece 58 by pins 81, 82.

It is important to recognize at the motion translation mechanism that contains the invention as shown in this embodiment will function with only a single-thrust support member, such as the half of 71, 72 shown in this FIG. 5. There need not be a thrust support member on the other side of the displacement member 61 so long as the circular linkpiece 58 is provided with sufficient journal bearing area to counteract the developed twist by the offset forces caused by the use of a single thrust support member.

Figure 6:
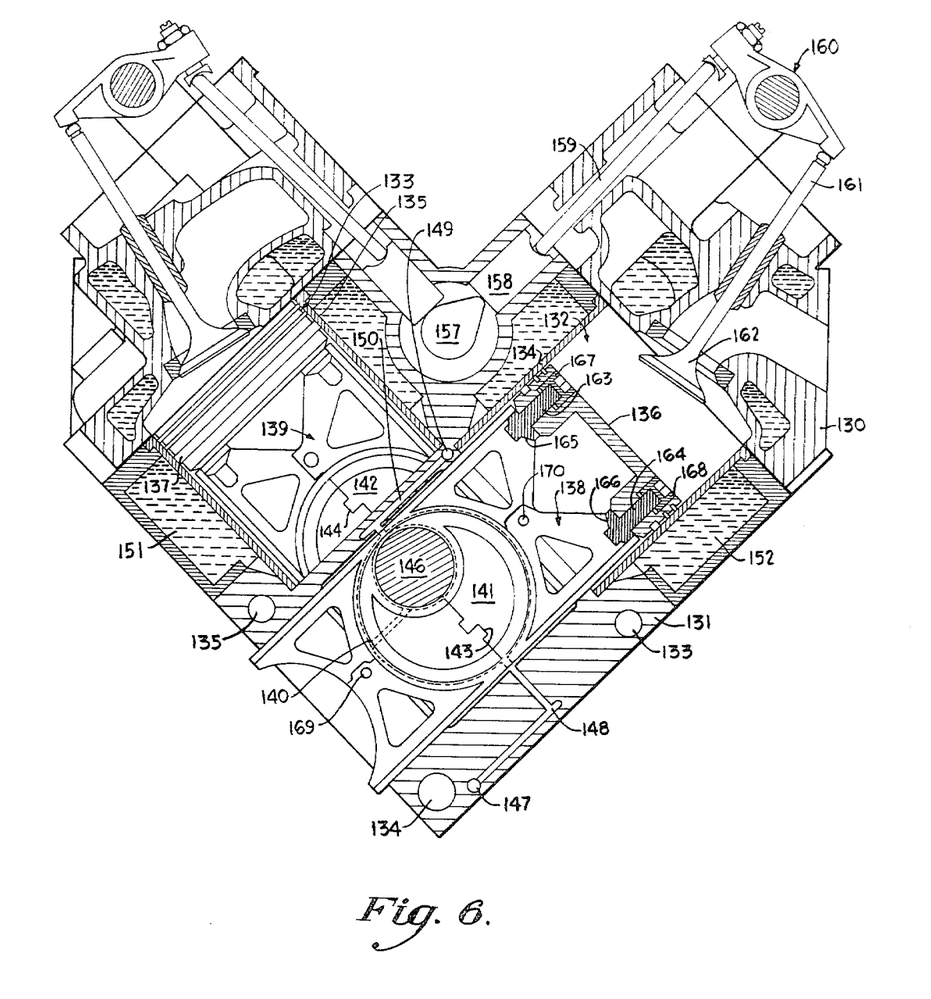
FIG. 6 is a cross section of a "V" type multi-cylinder engine embodying a species of the invention.
Figures 6A, 6B:
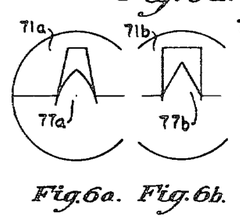
FIG. 6a, 6b, 6c, 6d, 6e, 6f, and 6g illustrate a variety of thrust support and thrust converting mechanisms.

In respect of the configuration that the thrust support member and the thrust coverting means may take attention is directed to FIG. 6a through FIG. 6g. There are a number of thrust support members 71a, 71b, 71c, 71d, 71e, 71f, 71g and the mating thrust converting means profiles that may be employed. For example FIG. 6a shows a profile that was obtained with a thrust support member 71a utilizing a 14 ½ degree rack gear profile.

FIG. 6b shows a thrust support member 71b in which there is utilized a straight sided gear profile with a mating single tooth thrust converting means 71b.

Figures 6C, 6D, 6E, 6F, 6G:
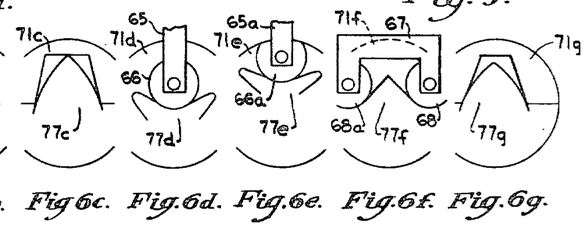

FIG. 6c shows a thrust support member 71c with a 14 ½ degree gear tooth opening profile. In this figure there is shown a larger opening for such a 14 ½ degree profile. A mating thrust converting means 77c is shown in mating engagement with the thrust support member.

In FIG. 6d the thrust support member 71d is comprised of two basic elements namely a bracket 65 which has secured thereto a roller 66. The development of a mating thrust converting means 77d results in a "Y" configuration illustrated. FIG. 6e is similar to FIG. 6d except the thrust support member 71e and its associated bracket 65a and roller 66a are displaced further away from the 22' axis as shown in FIG. 5. This displacement results in a shallower "Y" in the thrust converting means 71e.

FIG. 6f shows an arrangement wherein the thrust converting means 71f is comprised of a bracket 67 and a pair of rollers 68, 68a which cooperate with a straight sided single toothed thrust converting means 77f.

FIG. 6g shows a thrust support means 71g which has a 20 degree straight sided rack gear tooth profile. The mating thrust converting means 77g is shown in mating engagement.

In respect of a study of FIGS. 6a through 6g, it should be apparent that there are a multitude of multitooth designs for the thrust support member and thrust converting means that may be employed in the practice of the invention. While not shown in the figures, it is contemplated that the thrust support member and thrust converting means may have a helical toothed configuration.

Reference is now made once again to FIG. 5, 5a and 5b with specific attention drawn to FIG. 5a in which the details of construction of an internal combustion engine that embodies the invention. In this figure, the engine block 85 is shown disposed in a conventional fashion in respect of the cylinder head 84 by a plane parallel to the head surface 86. In addition the engine block 85 is split into two portions by a plane which is parallel to head surface 86 and includes XX' axis. This split is not shown in the drawings, nor are the means to fasten the split engine block. The details of the split engine block 85 and the means to fasten the block together are not critical to the invention. The cylinder block 85 is constructed of a light alloy while the cylinder liners 87, 88 are constructed of cast iron. The cylinder head 84, not shown in FIG. 5a, but shown in FIG. 5, may be constructed of either cast iron, if high rigidity is desired, or aluminum, if light weight is desired. The entire assembly is held together by a multiplicity of bolts; not shown, which pass through the cylinder head 84 into the engine block 85 parallel to the ZZ' axis and out through an opposing mating cylinder head not shown. In the illustration of FIG. 5, 5a and 5b, only the details of a single cylinder 50 have been shown as the remaining cylinders are basic duplications of the details of the invention as shown embodied in these FIGS. 5, 5a, and 5b.

The crankshaft 55 is a single plane crankshaft which in the case of the four cycle engine mandates that two cylinders be fired at once. By making the cylinders that are adjacent to one another fire simultaneously, the firing couple of the engine is greatly reduced which adds further to the smooth running already brought about by a perfect dynamic balance established by the incorporation of the invention into the motion translating mechanism of the engine. The single plane crankshaft 55 allows the use of a single cam shaft to operate the valve train comprised of follower piece 91, 91a, push rod 92, 92a, and valve stem 94. The valve stem for opposed piston 52b is not shown. The fact that the cam followers e.g. cam follower 91, 91a are opposed causes the cam shaft 90 driving forces through the valve train drives to be more even in nature. The cam shaft 90 is driven by a cam shaft drive gear 96 which is driven by a crankshaft gear 97. The crankshaft drive gear 97 mates with the crankshaft 55 and is driven thereby. The circular linkpiece 58 is split by a plane passing through its center of rotation 59 and parallel to the longitudenal axis YY' i.e. crankshaft axis 56. The single toothed thrust converting means 77 is secured to the circular linkpiece 58 in the manner described earlier. It should be understood that the invention contemplates a number of different ways to fabricate the respective parts of the motion translating mechanism of the invention. A preferred embodiment has been shown and those skilled in the art may select different manners of fabricating the respective parts of the mechanism without deparing from the spirit of the invention.

With this thought in mind the preferred embodiment shows the displacement member 61 in mating engagement with the cylinder liner 87. The displacement member 61 to cylinder liner 87 configuration has a radius that approximates the radius of the cylinder liner 87, see FIG. 5b. A review of FIG. 5b will allow an understanding of the lubrication techniques involved for the use with the motion translation mechanism of the invention. Lubrication is provided to ensure a free and frictionless means of sliding between cylinder liner 87 and the displacement member 61. Lubrication grooves 100, 101 connected to an oil pressure source not shown provide this lubrication. A further commentary on lubrication will be offered in greater detail in respect of the invention shown in the embodiment of FIG. 6. Suffice it to say that lubrication is of great importance to the efficient operation of the invention and there are provided a multitude of oil dusts 106, 107 in FIG. 5a which are provided to accomplish the desired lubrication. The details of the interconnection of these oil ducts with a source of oil under pressure is not shown.

Reference is now made to FIG. 3a through FIG. 3d which illustrates in schematic form another embodiment of the motion translation mechanism of the invention modified for use where the engine configuration takes the form of a "V." The adaptation and modification of the motion translation mechanism in the "V" configuration gives rise to the solution of how the motion translation mechanism may be employed in "X," "Y" or radial configurations. Accordingly, an understanding of the "V" configuration of FIG. 3a to FIG. 3d will give one skilled in the art a basic awareness of the mechanics necessary to incorporate the motion translating mechanism in other cylinder configurations.

Figure 3A:
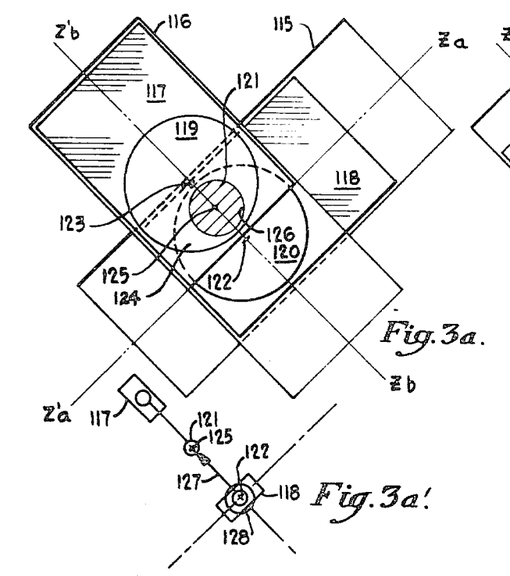
FIG. 3a, 3b, 3c and 3d illustrate a multi-cylinder arrangement embodying the invention with the motion translating mechanism of the invention in a variety of positions.

FIG. 3a shows a pair of cylinders 115, 116 positioned such that their respective axis ZaZa' and ZbZb' are 90 degrees apart. Positioned within cylinder 115 is a displacement member 118, which has located therein a circular linkpiece 120. Cylinder 116 has a displacement member 117 therein which displacement member 117 has located therein a circular linkpiece 119. The circular linkpieces 119, 120 are mounted for relative rotation in respect of displacement members 117, 118. Circular linkpiece 120 has a center axis designated by reference numeral 122 and associated arrow. In a similar fashion circular linkpiece 119 has a center axis 123 and associated arrow.

An eccentric pin 121 passes through both circular linkpieces 119, 120. In the region where the circular linkpieces 119, 120 overlap the circular linkpieces are securely fastened to each other by means not shown. The manner of their connection is not critical to the invention. The eccentric pin 121 with its center axis 125 is connected to a crank arm and crankshaft not shown.

Reference at this time to FIGS. 4, 4a, 4b and 4c which illustrate in three dimensional form the displacement members and the circular linkpieces that can be employed in an engine of the "V" configuration should enhance the readers' understanding of the typical appearance of the motion translating mechanism employed in an engine of the type now being described.

Returning to FIG. 3a it will be noted that the circular linkpieces 120 and 119 are positioned on the eccentric pin 121 such that they are 180 degrees apart and have their respective center axis 122, 121 spaced an equal distance on either side of the center axis 125 of eccentric pin 121.

It can be appreciated that any number of cylinders can be employed provided the proper relationship between the eccentric mounting of the circular linkpieces is maintained.

Figure 7:
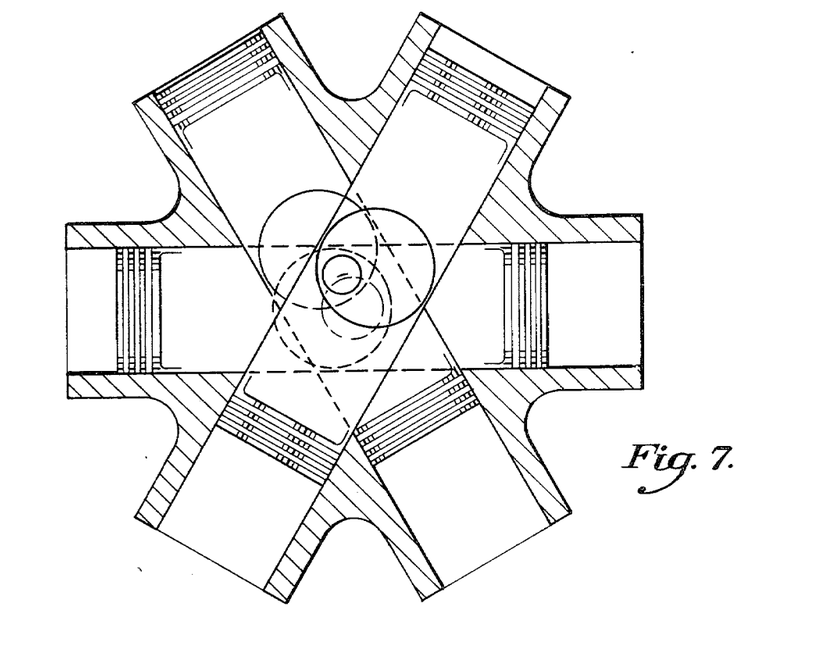
FIG. 7 is a cross section of a six cylinder radial engine block and motion translating mechanism that embodies the invention.
Figure 7A:
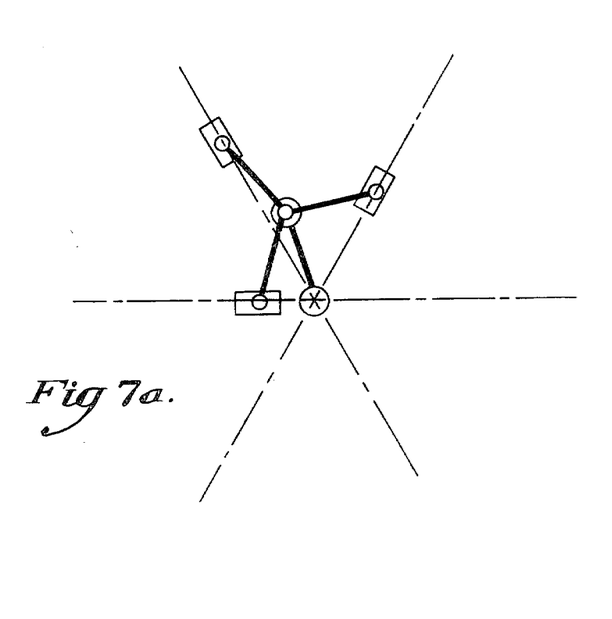
FIG. 7a is a modified vector diagram of the motion translation mechanism of FIG. 7.

In this regard attention is called to FIG. 7 and its associated vector diagram FIG. 7a which depicts a six cylinder configuration. No detailed discussion of these FIGS. 7 and 7a is offered as it is believed that one skilled in the art can readily appreciate this multicylinder configuration as falling with the spirit and scope of the invention.

The circular linkpieces 119, 120, FIG. 3a, while secured together at the region 124 are free to rotate on eccentric pin 121 about eccentric pin center axis 125. Each of the circular linkpieces 119, 120 are positioned for rotation in displacement members 117, 118 respectively. The nature of the mechanical relationship between the eccentric pin 121, circular linkpieces 119, 120; displacement members 117, 118 and the fixed relationship of the cylinders 115, 116 result in the circular linkpieces' center axis 123, 122 travel along respective cylinder axis $ZbZb'$ and $ZaZa'$.

Figure 3B:
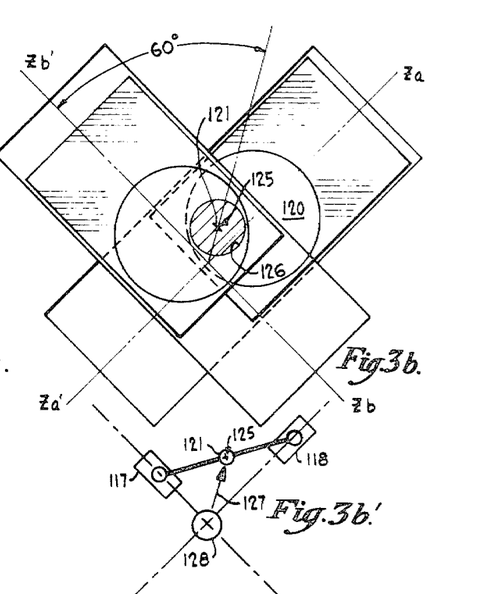
Figure 3C:
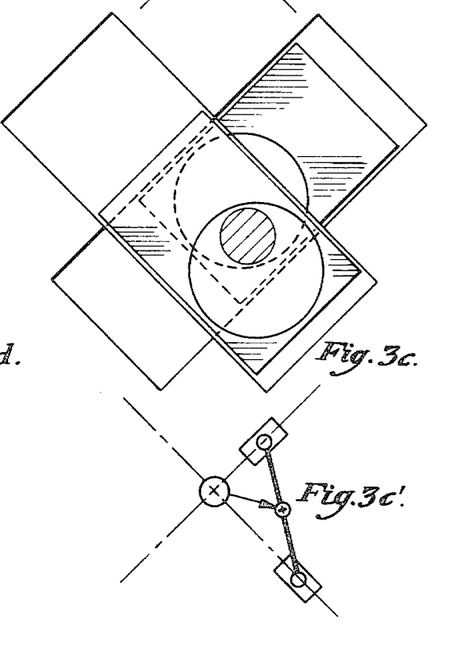
Figure 3D:
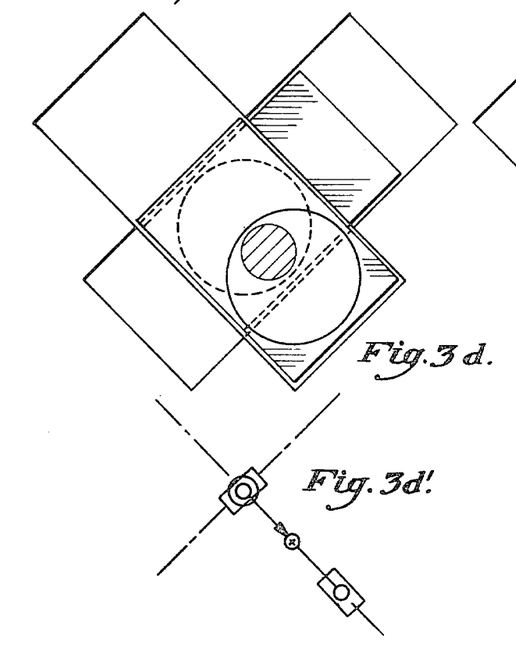
Figure 4:
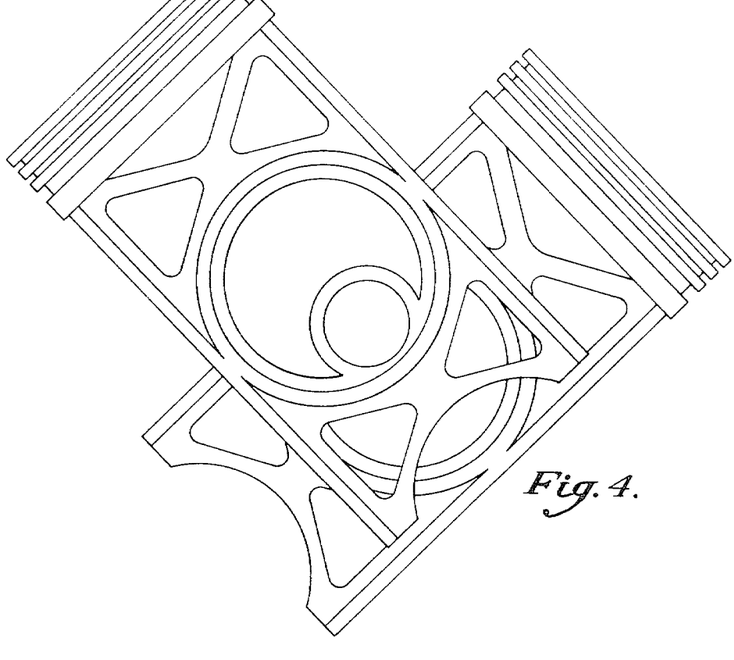
FIG. 4 is an illustration of a typical multi-piston configuration as it would appear in actual usage.
Figure 4A:
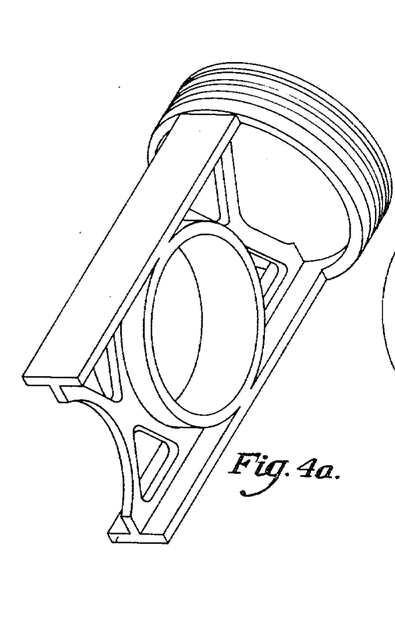
FIG. 4a and FIG. 4c show in three dimensional form a single piston and displacement member shown separated from the multi-piston configuration of FIG. 4.
Figures 4B, 4C:
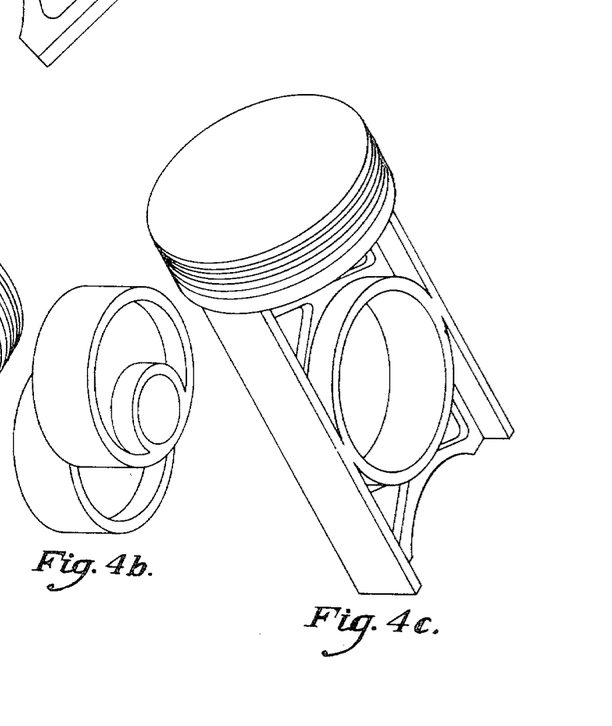
FIG. 4b shows in three dimensional form a pair of circular eccentric linkpieces shown separated from FIG. 4.

FIGS. 3b, 3c and 3d each illustrate progressive positions of the eccentric pin 121 as it rotates in a clockwise direction. The crankshaft and crank arm not shown, rotate with the eccentric pin 121. FIG. 3b shows the eccentric pin 121 having been rotated clockwise through 60 degrees which results in the circular linkpiece 120 counterclockwise rotation through 60 degrees about eccentric pin center 125. Accordingly, circular linkpiece 120 rotates about the eccentric pin 121 with the same angular velocity, but of opposite direction as the crankshaft not shown.

It will be appreciated by those skilled in the art that this configuration of the invention reduces the amount of side force borne by the displacement members 117, 18 to less than that borne by a piston skirt in a conventional piston engine with short connecting rods in relation to the stroke. It should also be recognized that if the crankshaft, crank arm (not shown) and eccentric pin 121 were removed leaving the hole 126 in circular linkpieces 119, 120, the hole 126 with center 125 will move through a locus of points that will describe a circular path and therefore the system containing the invention in this embodiment does not need the support of the crankshaft. The very nature of the motion translating mechanism is such that the circular path just described maintains itself circular. The removal of the crankshaft and eccentric pin 121 will allow the engine to function as a free piston engine where the exhaust gases are employed to drive some other device. It is, therefore, possible to limit the forces on the eccentric pin 121 to those of only torque which is normal to the crankshaft vector 127 as shown in FIG. 3a, and in FIGS. 3a', 3b', 3c', 3d'. The crankshaft 128 is represented by a circle, while displacement members 117, 118 are represented by rectangular blocks. Conversely, when a plurality of dual "V" cylinders are employed it is possible to arrange a crankshaft such that it is borne by the plurality of journals formed by the eccentric pins and circular linkpiece openings, thereby reducing the number of main bearings that are necessary.

It will be appreciated by those skilled in the art that the entire reciprocating mass system can be reduced to a single rotating vector which rotates at the same angular velocity as that of the crankshaft vector 127 and therefore the system may be kept in perfect balance by the addition of simple counter-weights on the crankshaft web. It should also be recognized that multiple cylinders correctly arranged with respect to phase will also completely cancel the unbalanced forces since all motions are either circular or sinusoidal.

Reference is now made to FIG. 6 which depicts in cross-section a portion of an engine in which two cylinders 132, 133 of a V8 engine are shown. Only two cylinders have been shown as it is obvious that any number of pairs of cylinders could be stacked or placed side by side to accomplish the creation of any even membered "V" configuration. FIG. 6 represents a preferred embodiment of the invention in that it represents an engine of a design that may be readily manufactured by a small tool room. A production version of course would be somewhat different in respect of the details of the elements of the total assembly.

The engine of FIG. 6 includes an engine head 130 of conventional design which head 130 is secured to an engine block 131 by means of bolts not shown. A pair of cylinders 132, 133 are disposed in the engine block 131 in the manner shown.

Cylinder 132 has a cylinder liner 134 which is secured to the engine block 131 by any suitable means of adhesion. In a like fashion cylinder 133 has a cylinder liner 135. Positioned within the cylinder 132 is a piston 136 which is secured to displacement member 138 by threaded bolts 163, 164. The displacement member 138 can be fashioned of two pieces secured together by pins 169, 170. The two piece construction of displacement member 138 facilitates assembly. In actual construction of the engine it has been found that only one of the two adjacent displacement members need be fashioned of the two piece construction. The threaded bolts have head portions brazed at points 165, 166 to the displacement member 138. The threaded portions 163, 164 pass through a portion of the piston 136 and are secured by allen nuts 167, 168.

Positioned within a circular opening 140 of the displacement member 138 is circular linkpiece 141 which has been shown in two fitted pieces with a staggered mating engagement line 143. The circular linkpiece 142 is shown fitted in mating relationship with eccentric pin 146. The eccentric pin 146 is in turn connected to a crank arm and crankshaft both not shown.

Piston 137 in cylinder 133 is of a similar construction and has a displacement member 139 secured to the piston 137. The displacement member 139 also has positioned therein a circular linkpiece 142, which circular linkpiece is split along the line 144. The split in the circular linkpieces 141, 142 are provided for ease in manufacture and assembly of the engine.

Lubrication is provided to the displacement members 138, 139 via oil pressure ports 147, 149 by respective conduits 148, 150. The displacement members 138, 139 are supported on hydrodynamic bearings created by the oil furnished under pressure by conduits 148, 150.

A cam shaft 157 drives the valve 162 for cylinder 132 via a cam follower 158, push rod 159, rocker arm assembly 160 and valve stem 161. The engine block 131 is cooled by the passage of coolant through coolant passages 151, 152 from a source of coolant not shown.

In the assembly of the engine stacked cylinder sections are held together by means of bolts (not shown) passing through bolt hole openings 133, 134, 135.

Figure 8:
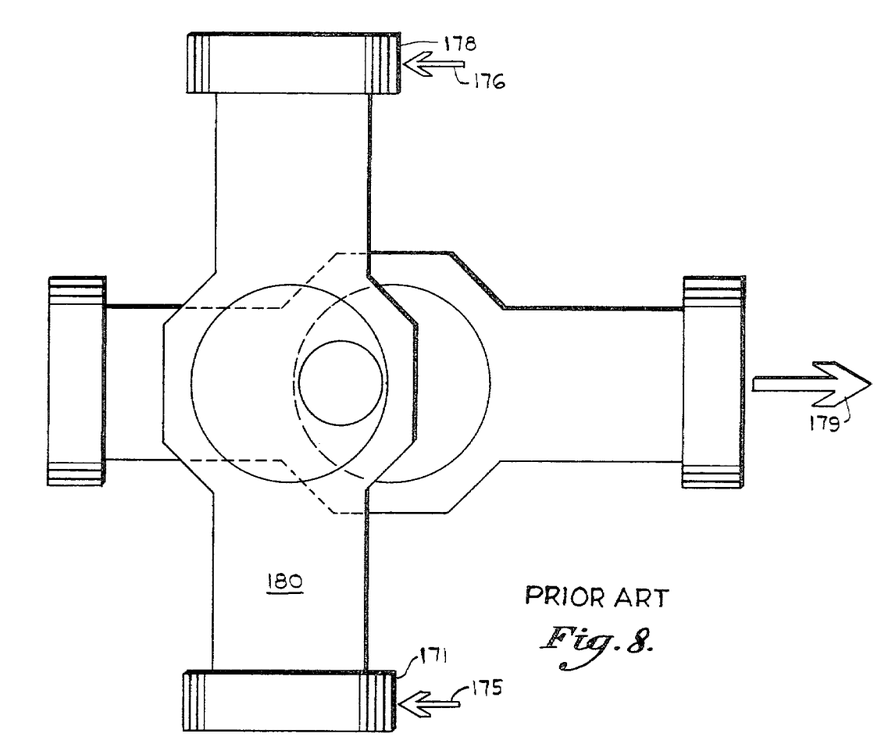
FIG. 8 is a schematic showing of the prior art.

Reference is now made to FIG. 8 which illustrates the prior art as best exemplified by the cruciform engine notes at the outset of the specification. As was noted earlier, a major disadvantage of this cruciform arrangement resides in the fact that side forces 175, 176 generated by the mechanism, graphically depicted by arrows in this figure, are borne by the skirts of the pistons 177, 178. These side forces 175, 176 when viewed in conjunction with the force created by the other opposed piston movement graphically shown by arrow 179 introduce a bending moment to the reciprocating structural member 180 directly connected to the pistons. This requires that the reciprocating member 180 be of a large size to thereby handle the bending forces.

Figure 9:
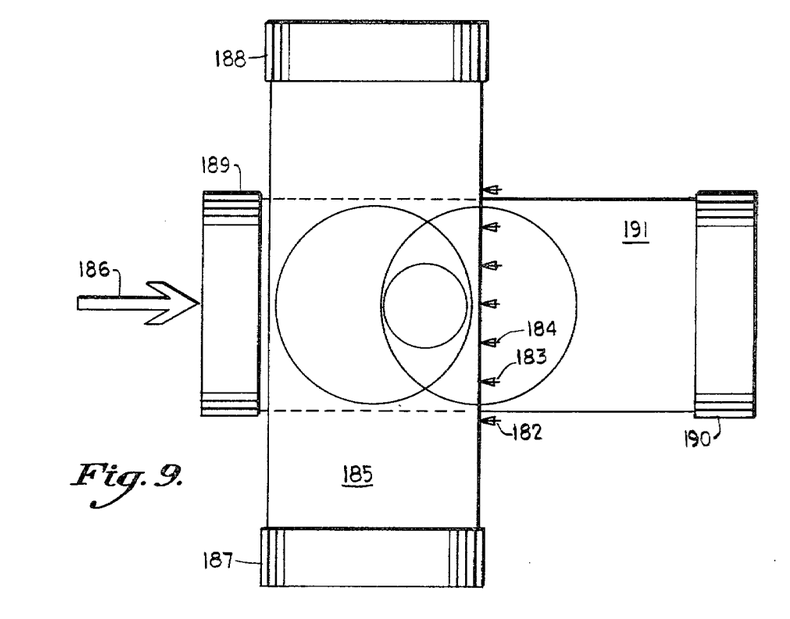
FIG. 9 is a schematic showing of the basic components of the invention for ready comparison to the prior art showing of FIG. 8.

In respect of FIG. 9, it will be appreciated that there is shown the invention in a form that allows ready comparison with the prior art arrangement of FIG. 8. It can be seen in FIG. 9 that the side forces 182, 183, 184 are carried uniformly by the displacement member 185 and are thereby transmitted uniformly to a side wall not shown. The opposed piston forces illustrated by arrow 186 in conjunction with the side forces 182, 183, 184 create little or no bending forces in the reciprocating structure of the displacement member 185 because the side forces 182, 183, 184 are borne by a bearing surface (not shown) which is provided in close proximity to the crankshaft center line. This unique arrangement of the invention allows the pistons 187, 188, 189, 190 secured to displacement members 185 and 191 to travel the length of the cylinder bore (not shown) without the requirement for actual contact with the bore.

Although a number of embodiments of the present invention have been illustrated and described, it will be apparent to those skilled in the art that various changes and modifications may be made to these embodiments without departing from the spirit of the invention.

Having thus described my invention, what I claim is:

1. A reciprocating to rotary motion mechanism including in combination
   (a) a crankshaft having a crank arm with an eccentric pin integrally secured to said crank arm, said crankshaft mounted so that said crank arm and said eccentric pin rotate about a crankshaft axis,
   (b) a circular linkpiece having a center axis parallel to said crankshaft axis, said circular linkpiece having an opening positioned eccentric to said circular linkpiece center axis,
   said crank arm eccentric pin positioned within said circular linkpiece eccentric opening in a manner that allows relative rotary movement between said eccentric pin and said circular linkpiece in a path in a fixed plane,
   (c) at least one first thrust converting means secured to said circular linkpiece for rotation therewith,
   (d) a displacement member mounted in a sliding abutting relationship between a pair of walls for reciprocating motion therebetween,
   (e) said walls containing internally projecting second and third thrust converting means,
   (f) said displacement member having a circular opening in said fixed plane, said circular opening having a central axis at right angles to said fixed plane,
   (g) said circular linkpiece is positioned in mating relationship within said displacement members circular opening,
   (h) said first thrust converting means of said circular linkpiece coming into consecutive mating engagement with said second and third thrust converting means during the reciprocating travel of said displacement member,
   said displacement member reciprocating motion is converted to rotary motion of said crankshaft about said crankshaft axis through the relative motion of said displacement member, said circular linkpiece and said integrally secured eccentric pin of said crankshaft.

2. The reciprocating to rotary motion mechanism of claim 1 wherein said first thrust converting means is a gear segment.

3. The reciprocating to rotary motion mechanism of claim 2 wherein said second and third thrust converting means are internally projecting gear segments.

4. The reciprocating to rotary motion mechanism of claim 3 wherein said first thrust converting means is a convex gear segment and said second and third thrust converting means are concave gear segments.

5. The reciprocating to rotary motion mechanism of claim 1 wherein said first thrust converting means is a convex cam shaped element and said second and third thrust converting means are concave cam followers.

6. The reciprocating to rotary motion mechanism of claim 3 wherein said first, second and third thrust converting gear segments are each less than 360°.

7. The reciprocating to rotary motion mechanism of claim 1 wherein said displacement member and said sliding abutting relationship between said walls forms a hydrodynamic bearing.

8. An internal combustion engine having in combination
   (a) a piston mounted for movement within the walls of a cylinder,
   (b) a displacement member rigidly secured to said piston for movement therewith,
   (c) a crankshaft having a crank arm with an eccentric pin integrally secured to said crank arm, said crankshaft mounted so that said crank arm and said eccentric pin rotate about a crankshaft axis,
   (d) a circular linkpiece having a center axis parallel to said crankshaft axis, said circular linkpiece having an opening positioned eccentric to said circular linkpiece center axis,
   said crank arm eccentric pin positioned within said circular linkpiece eccentric opening in a manner that allows relative rotary movement between said eccentric pin and said circular linkpiece in a path in a fixed plane,
   (e) said displacement member having a circular opening in said fixed plane, said circular opening having a center axis at right angles to said fixed plane,
   (f) at least one first thrust converting means secured to said circular linkpiece for rotation therewith,
   said cylinder walls containing internally projecting second and third thrust converting means,
   said first thrust converting means of said circular linkpiece coming into consecutive mating engagement with said second and third thrust converting means during movement of said displacement member,
   (g) said circular linkpiece is positioned in mating relationship within said displacement members circular opening whereby said piston and said displacement members travel is converted to rotary motion of said crankshaft about said crankshaft axis through the relative motion of said piston and displacement member; said circular linkpiece and said integrally secured pin of said crankshaft.

9. The internal combustion engine of claim 8 wherein said first thrust converting means is a gear segment.

10. The internal combustion engine of claim 8 wherein said second and third thrust converting means are internally projecting gear segments.

11. The internal combustion engine of claim 9 wherein said first thrust converting means is a convex gear segment and said second and third thrust converting means are concave gear segments.

12. The internal combustion engine of claim 8 wherein said first thrust converting means is a convex cam shaped element and said second and third thrust converting means are concave cam followers.

13. The internal combustion engine of claim 9 wherein said first, second and third thrust converting gear segments are each less than 360°.

* * * * *